3,265,683
CERTAIN 3-ACYLAMIDOALKYL-3-AZABICYCLO
[3.2.2]NONANE COMPOUNDS
Jack Bernstein, New Brunswick, N.J., assignor, by mesne assignments, to E. R. Squibb & Sons, Inc., New York, N.Y., a corporation of Delaware
No Drawing. Filed Jan. 16, 1963, Ser. No. 251,763
7 Claims. (Cl. 260—239)

This invention relates to novel amides of 3-azabicyclo-[3.2.2]nonane. More particularly, the invention relates to novel amides of 3-azabicyclo[3.2.2]nonane of the formula (I) 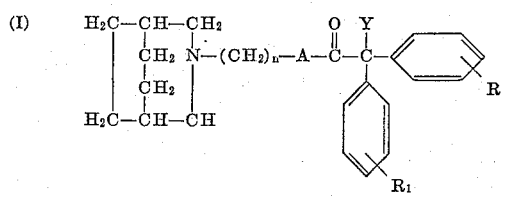

and to acid addition and quaternary ammonium salts thereof.

A in the above formula represents NH and N-alkyl. Y represents in the above formul hydrogen, halogen, hydroxy and alkoxy. R and $R_1$ each represents hydrogen, alkyl, trihalomethyl and alkoxy. The symbol $n$ represents 2, 3, or 4.

The alkyl groups included in A, R and $R_1$ are preferably straight or branched chain lower alkyl groups such as methyl, ethyl, propyl, isopropyl, butyl, isobutyl, t-butyl, amyl, hexyl and the like. The alkoxy groups represented by R, $R_1$ and Y are preferably straight and branched chain lower alkoxy groups such as methoxy, ethoxy, propoxy, isopropoxy, butoxy and the like.

All four halogens are contemplated within the meaning of the symbols Y, R and $R_1$, but chlorine and bromine are preferred. In the case of trihalomethyl, trifluoromethyl is preferred.

The compounds of Formula I may be produced by reacting a 3-azabicyclo[3.2.2]nonane-3-alkylamine (i.e., wherein $R_4$ in Formula II below represents $NH_2$ or NH-alkyl) with a substituted or unsubstituted diphenyl acetyl halide. This reaction is carried out in an inert, moderately high boiling hydrocarbon solvent, e.g., an aromatic hydrocarbon such as toluene, preferably with heating. If an α-halogenated diphenyl acetyl halide is used as one reactant then a compound of Formula III results wherein $R_3$ is halogen. This compound may then be hydrolyzed in aqueous solution to produce the compound of Formula IV wherein $R_2$ is hydrogen. Similar treatment with an alcohol yields compounds of Formula IV wherein $R_2$ represents alkyl. Heating accelerates the hydrolysis or alcoholysis reactions.

These reactions may be represented by the following flow diagram.

(II) 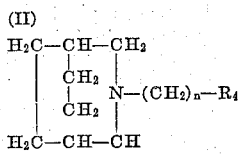

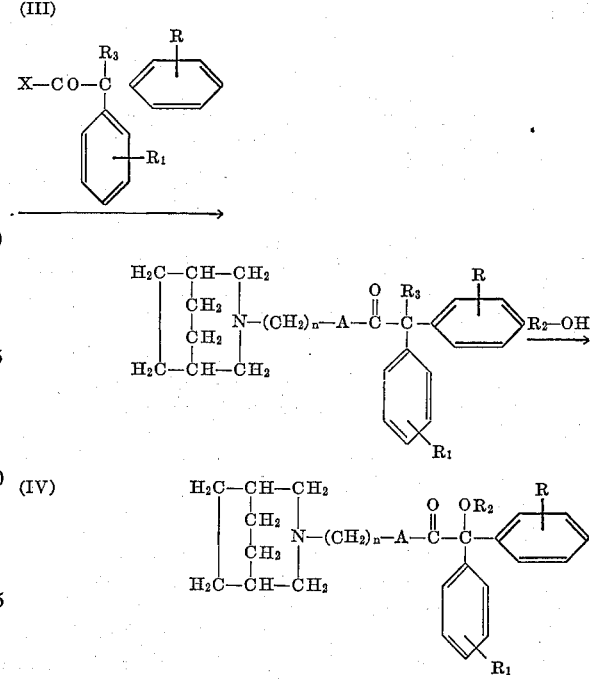

The symbols $n$, R and $R_1$ have the same meaning as defined previously. X represents halogen, $R_2$ represents hydrogen or lower alkyl, and $R_3$ represents hydrogen or halogen, and $R_4$ represents $NH_2$ or NH-lower alkyl.

The starting material of Formula II, when $R_4$ represents —$NH_2$, is prepared by condensing 3-azabicyclo-[3.2.2]nonane, in an inert organic solvent such as toluene, with a halogenated nitrile such as chloroacetonitrile and the product is then reduced, e.g., with lithium aluminum hydride, in a non-aqueous medium such as ether, to form the primary amine. The primary amine may then be converted to a secondary amine (i.e., wherein $R_4$ is lower alkylamino) by reaction with an acylating agent, such as acetyl chloride or propionyl bromide and reducing the amide thus formed to a secondary amine with the lithium aluminum hydride in a non-aqueous medium such as ether or tetrahydrofuran.

Alternately, the primary amine may be converted to a secondary amine by reaction with a carbonyl compound (aldehyde or ketone) such as acetaldehyde or acetone, and reducing the Schiff-base thus formed to a secondary amine. In the special case where $R_4$ is methylamino, the primary amine may be converted to the methylamino derivative by reaction with chloral in an inert organic solvent to yield the formamido derivative, which is then reduced with lithium aluminum hydride in an inert solvent such as ether.

Alternately, the starting material of Formula II, when $R_4$ represents amino and $n$ is 3, can be prepared by the reaction of 3-azabicyclo[3.2.2]nonane with acrylonitrile and reducing the aminonitrile thus formed with lithium aluminum hydride in an inert solvent such as ether.

The novel amides of Formula I form acid addition salts by reaction with the common organic and inorganic acids. The salts include, for example, the hydrohalides, e.g., hydrochloride, hydrobromide, hydroiodide, phosphates, nitrate, sulfate, acetate, oxalate, tartrate, malate, citrate, camphorsulfonate, benzoate, salicylate, ascorbate, alkanesulfonate, e.g., methanesulfonate, arylsulfonate, e.g., benzenesulfonate, toluenesulfonate and the like. It is frequently convenient to effect the isolation of the compound in the form of its acid addition salt. The free base may then be released by reaction with a base, e.g., aqueous sodium hydroxide.

These amides also form quaternary ammonium salts, for example with lower alkyl halides such as methyl chloride, methyl bromide, ethyl chloride, ethyl bromide, ethyl iodide and the like, lower alkyl sulfates such as methyl sulfate, ethyl sulfate and the like, aralkyl halides such as benzyl chloride, phenethyl bromide and the like.

All such salts are within the scope of this invention.

The new compounds of this invention are useful as antihistamines and antispasmodic agents. They may be administered orally or parenterally by incorporating the appropriate dosage of the amide or a physiologically acceptable acid addition salt or quaternary ammonium salt thereof together with conventional carriers or excipients in a tablet, capsule, elixir, injectable or the like according to accepted pharmaceutical practice.

The following examples are illustrative of the invention. All temperatures are in degrees centigrade.

*Example 1.—N-[2-(3-azabicyclo[3.2.2]nonane-3-yl)ethyl]benzilamide, hydrochloride*

(a) *Preparation of 3-azabicyclo[3.2.2]nonane-3-ethylamine.*—A solution of 19 g. (0.25 mole) of freshly distilled chloroacetonitrile in 75 ml. of anhydrous toluene is added at room temperature to a solution of 63 g. (0.5 mole) of 3-azabicyclo[3.2.2]nonane in 350 ml. of toluene. After stirring for one hour, during which time the temperature of the reaction mixture rises spontaneously to 50°, the reaction mixture is heated for two hours at 100°. After cooling to room temperature and adding 200 ml. of ether, 40 g. (theory) of 3-azabicyclo[3.2.2]nonane, hydrochloride, is removed by filtration under suction. The filtrate is extracted with 5% hydrochloric acid. The free base is liberated from the acidic aqueous solution with 10% sodium hydroxide and extracted into ether. After drying over magnesium sulfate and filtration, the solvent is removed by distillation. The residue of crude product weighs 37 g. and solidifies at room temperature. After recrystallization from petroleum ether, 32.5 g. are recovered (80%) with a melting point of 55–56°.

A solution of 31.5 g. (0.19 mole) of the above 3-azabicyclo[3.2.2]nonane-3-acetonitrile in 300 ml. of anhydrous ether is treated with a suspension of 7.6 g. (0.20 mole) of lithium aluminum hydride in 300 ml. of anhydrous ether. After hydrolysis with 25 ml. of water followed by a solution of 6 g. of sodium hydroxide in 36 ml. of water, the ethereal solution is decanted from the resulting precipitate and dried over magnesium sulfate. The solvent is removed from the filtered ethereal solution by distillation leaving a residue of 30 g. of crude product as an oil. The oil distills at 67–69° at 0.2–0.3 mm. pressure with a yield of 21.5 g. (67%).

(b) *Preparation of N-[2-(3-azabicyclo[3.2.2]nonane-3-yl)-ethyl]-2-chloro-2,2-diphenylacetamide, hydrochloride.*—A solution of 10.6 g. (0.04 mole) of α-chlorodiphenylacetyl chloride in 50 ml. of anhydrous toluene is added dropwise with stirring to a cooled solution of 6.7 g. (0.04 mole) of 3-azabicyclo[3.2.2]nonane-3-ethylamine in 100 ml. of anhydrous toluene. Following the addition, the reaction mixture is warmed with stirring at 85–90° for 45 minutes, cooled and diluted to twice its volume with anhydrous ether. The solid which separates is recovered by filtration under suction and washed with ether to give a yield of 12 g. (70% of theory) with a melting point of 215–217° when recrystallized from a chloroform-ether mixture.

(c) *Preparation of N-[2-(3-azabicyclo[3.2.2]nonane-3-yl)-ethyl] benzilamide, hydrochloride.*—A suspension of 11 g. (0.025 mole) of N-[2-(3-azabicyclo[3.2.2]nonane-3-yl)ethyl]-2-chloro-2,2-diphenylacetamide, hydrochloride, in 250 ml. of water is warmed on a steam bath of 30 minutes; solution of the solid results within 5 minutes at 85–90°. The aqueous solution is washed with ether. The free base is liberated by the addition of 5% aqueous sodium hydroxide and extracted into ether. After drying over magnesium sulfate, filtration and removal of the solvent, 9 g. of free base is recovered (94% of theory).

The hydrogen chloride salt of the above free base is prepared by the addition of an ethereal solution of one equivalent of anhydrous hydrogen chloride (6.5 ml. of 3.6 N) to an ethereal solution of 8.5 g. (0.02 mole) of the base and purified to a constant melting point of 176/178° (dec.) by recrystallization from acetonitrile, with a yield of 5.5 g. or 59% of theory.

*Example 2.—N-[2-(3-azabicyclo[3.2.2]nonane-3-yl)ethyl]-N-methylbenzilamide, hydrochloride*

(a) *Preparation of N-[2-(3-azabicyclo[3.2.2]nonane-3-yl)-ethyl]-formamide.*—Following the procedure of Blicke and Lu [J. Am. Chem. Soc., 74, 3933 (1952)] for the formylation of amines, 36.6 g. (0.22 mole) of 3-azabicyclo[3.2.2]nonane-3-ethylamine is reacted with 35.5 g. (0.22 mole) of chloral with chloroform as a solvent. A yield of 29 g. (62% of theory) melting at 69°–71° is obtained after recrystallization of the crude product from hexane.

(b) *Preparation of 3-[2-(methylamino)ethyl]-3-azabicyclo[3.2.2]nonane.*—Following the procedure of Blicke and Lu [J. Am. Chem. Soc., 74, 3933 (1952)] for the reduction of N-formyl derivatives of amines, 28 g. (0.14 mole) of the above formamide are reduced with 5.8 g. (0.15 mole) of lithium aluminum hydride with ether as a solvent resulting in a yield of 20.0 g. (78% of theory) of the purified amine distilling at 76–78° at 0.7 mm.

(c) *Preparation of N-[2-(3-azabicyclo[3.2.2]nonane-3-yl)-ethyl]-N-methyl-2-chloro-2,2-diphenylacetamide, hydrochloride.*—A solution of 9.1 g. (0.05 mole) of the above base in 100 ml. of anhydrous toluene is reacted with 13.2 g. (0.05 mole) of α-chlorodiphenylacetyl chloride in 200 ml. of anhydrous toluene as described in Example 4. A yield of 12 g. (53% of theory) of the hydrochloride salt is isolated melting at 207–209° when recrystallized from acetonitrile.

(d) *Preparation of N-[2-(3-azabicyclo[3.2.2]nonane-3-yl)-ethyl]-N-methylbenzilamide, hydrochloride.*—A suspension of 10 g. (0.02 mole) of the precursor in 150 ml. of water is warmed on a steam bath at a reaction temperature of 80–90° for 30 minutes. The free base is released from the resulting aqueous acidic solution and converted to the hydrochloride salt as described in Example 4. The hygroscopic crude hydrochloride salt upon purification by trituration of the solid with hot acetonitrile and recrystallization of the acetonitrile soluble portion from ethanol, results in the isolation of 3.2 g. of the desired product, M.P. 218–220°.

*Example 3.—N-[3-(3-azabicyclo[3.2.2]nonan-3-yl)propyl]-2,2-bis(p-methoxyphenyl)acetamide, hydrochloride*

(a) *Preparation of 3-(3-azabicyclo[3.2.2]nonan-3-yl)propylamine.*—A mixture of 53 grams of freshly distilled acrylonitrile and 125 grams of 3-azabicyclo[3.2.2]nonane is warmed at 50° for twenty-four hours. The mixture is then fractionated under reduced pressure to yield the desired 3-(3-azabicyclo[3.2.2]nonan-3-yl)propionitrile.

A solution of 33 grams of the 3-(3-azabicyclo[3.2.2]nonan-3-yl)propionitrile in 300 ml. of anhydrous ether is treated with a suspension of 7.6 grams of lithium aluminum hydride in 300 ml. of anhydrous ether. After hydrolysis with 25 ml. of water and treatment with a solution of 6 g. of sodium hydroxide in 36 ml. of water, the ethereal solution is decanted from the resulting precipitate and dried over magnesium sulfate. The solvent is removed and the residue distilled under reduced pressure to yield the desired amine.

(b) *Preparation of N-[3-(3-azabicyclo[3.2.2]nonan-3-yl)propyl]-2,2-bis(p-methoxyphenyl)acetamide, hydrochloride.*—A solution of 29 grams of 2,2-bis(p-methoxyphenyl)acetyl chloride in 100 ml. of anhydrous toluene is added dropwise, with vigorous stirring, to a cooled solution of 18.2 grams of 3-(3-azabicyclo[3.2.2]nonan-3-yl)propyl amine in 200 ml. of anhydrous toluene. The reaction mixture is then warmed, with stirring at 85–90° for one hour, cooled and diluted with 700 ml. of anhydrous ether. The solid which separates is recovered by filtration and washed with ether to yield N-[3-(3-azabicyclo[3.2.2])nonan-3-yl)propyl]-2,2-bis(p-methoxyphenyl)acetamide, hydrochloride.

The product is recrystallized from a mixture of ethanol and ether.

*Example 4.—N-[2-(3-azabicyclo[3.2.2]nonane-3-yl)-ethyl]benzilamide, methoiodide*

A solution of 5 grams of the base from Example 4(c) is dissolved in dry acetonitrile and treated with 5 grams of methyl iodide. The reaction mixture is heated to gentle reflux for two hours, cooled and diluted with anhydrous ether. The precipitated salt is recovered by filtration.

What is claimed is:

1. A compound of the formula

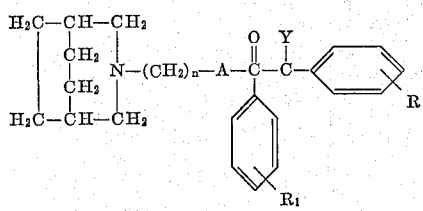

wherein A is a member of the group consisting of NH and N-lower alkyl, Y is a member of the group consisting of hydrogen, halogen, hydroxy and lower alkoxy, R and $R_1$ each is a member of the group consisting of hydrogen, halogen, lower alkyl, trihalomethyl and lower alkoxy, and $n$ is an integer from 2 to 4, and physiologically acceptable acid addition and quaternary ammonium salts thereof.

2. A compound of the formula

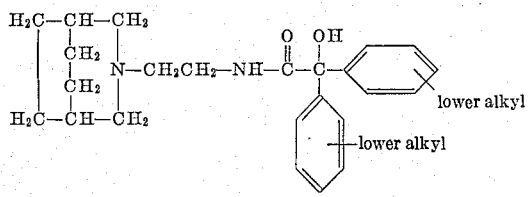

3. A compound of the formula

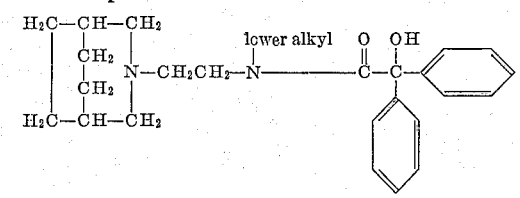

4. N - [2-(3-azabicyclo[3.2.2]nonan-3-yl)-ethyl]benzilamide.

5. N[2 - (3 - azabicyclo[3.2.2]nonan - 3-yl)-ethyl]-N-methyl benzilamide.

6. A compound of the formula

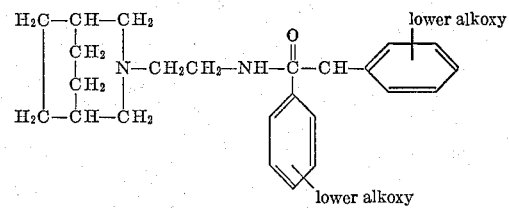

7. N - [3-(3-azabicyclo[3.2.2]nonan-3-yl)propyl]-2,2-bis(p-methoxyphenyl)acetamide.

References Cited by the Examiner

UNITED STATES PATENTS

| | | | |
|---|---|---|---|
| 2,735,847 | 2/1956 | Blicke | 260—239 |
| 2,953,565 | 9/1960 | Faust et al. | 260—473 |
| 2,987,517 | 6/1961 | Martin et al. | 260—473 |
| 3,078,272 | 2/1963 | Mull | 260—239 |
| 3,173,909 | 3/1965 | Brown et al. | 260—239 |

OTHER REFERENCES

Burger, Medicinal Chemistry (New York, 1960), pages 490–491 (1960).

Najer et al., Bull. Soc. Chim. France, 1962 (8–9), pp. 1593–7.

ALEX MAZEL, *Primary Examiner.*

WALTER A. MODANCE, *Examiner.*